Dec. 23, 1930.  F. W. BAKER  1,785,995
WHEEL FELLY
Filed Jan. 27, 1928  2 Sheets-Sheet 1
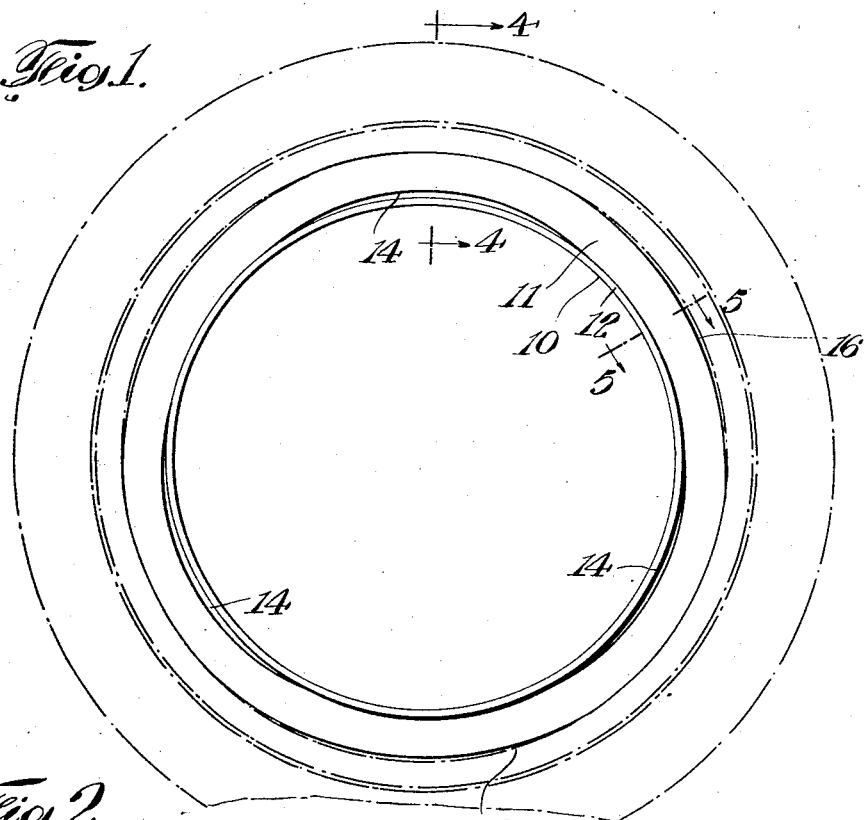
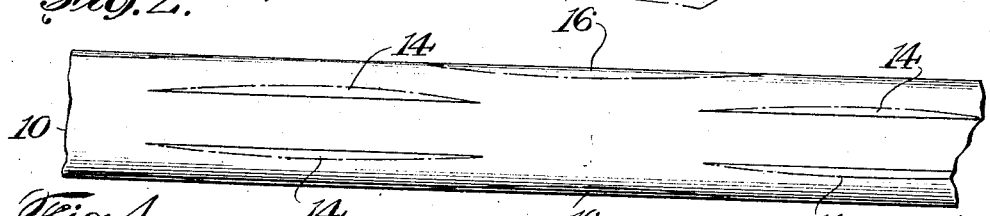
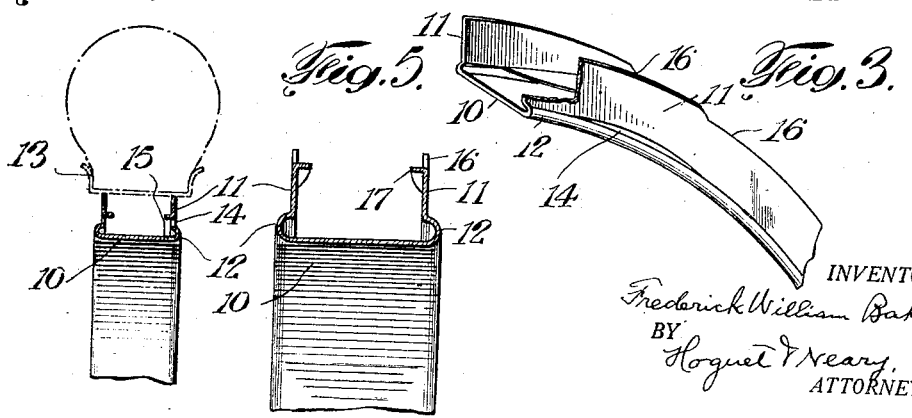
INVENTOR.
Frederick William Baker,
BY Hoguet & Neary,
ATTORNEYS.

Dec. 23, 1930.  F. W. BAKER  1,785,995
WHEEL FELLY
Filed Jan. 27, 1928    2 Sheets-Sheet 2
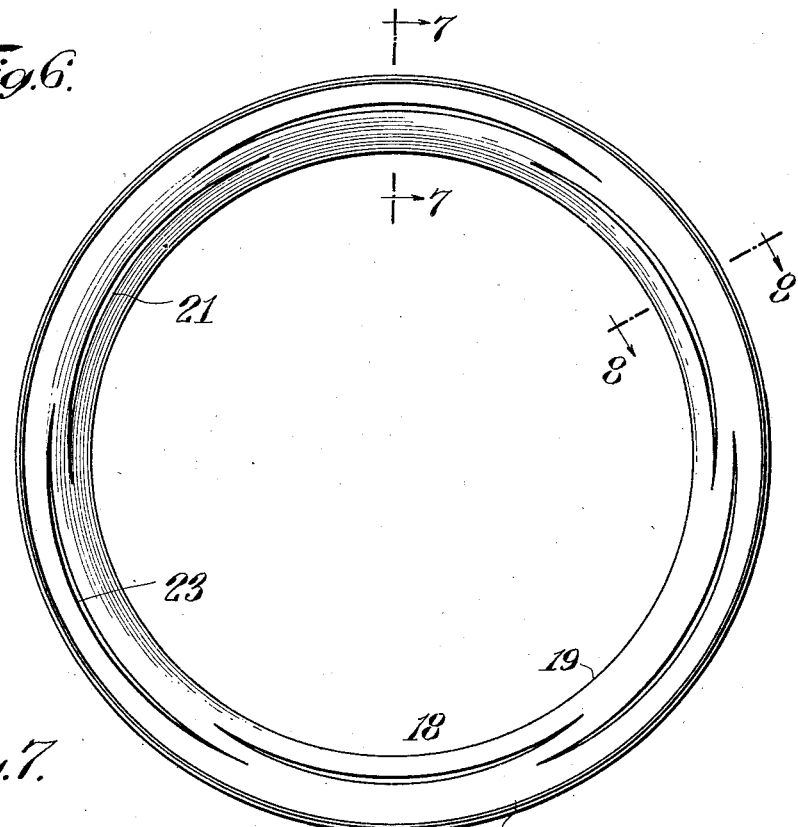
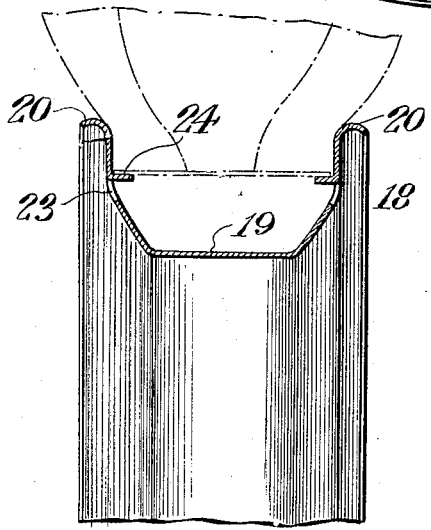
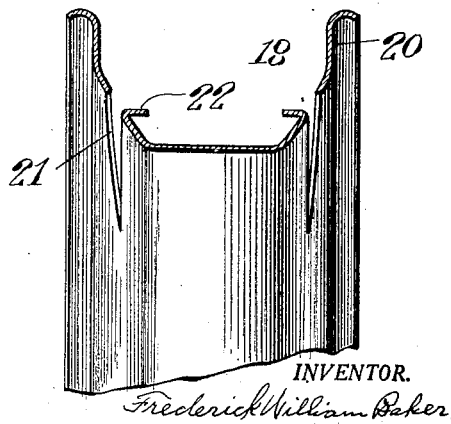
INVENTOR.
Frederick William Baker.
BY Hoguet & Neary.
ATTORNEYS.

Patented Dec. 23, 1930

1,785,995

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

WHEEL FELLY

Application filed January 27, 1928. Serial No. 249,795.

My invention relates to improvements in wheel fellies, and particularly wheel fellies such as are adapted for use in wheels of vehicles, and especially motor cars. In my re-issue Letters Patent of the United States No. 16,287, dated March 9th, 1926, I have disclosed a vehicle wheel in which the connection between the spoke system and the rim is of such a nature that no direct radial thrust is imparted to any portion of the wheel or vehicle, but the strains are dissipated and diffused through the whole wheel without noticeable deformation.

In my application for Letters Patent of the United States Serial No. 122,133, filed July 13th, 1926, and patented May 22, 1928, Patent No. 1,670,431, I have shown a further development of this principle and its application to a wheel disc.

My present invention embodies a further development of the principle and some improvements thereon, but more particularly the means of applying this principle to the felly of a wheel without regard to the character of the spoke system or of the rim which the felly carries or of which it forms a part. This is important because in adapting the principle to commercial production it often happens a manufacturer is committed by his installation to a certain type of felly, and that he would hesitate to change his plant to make a new type of wheel, when he might readily adopt an adaptation of a felly which would require no appreciable change of constructive mechanism. My invention, therefore, in the present instance relates to the adaptation of the principles referred to to a felly, and comprises a weakening of the felly between the spoke system and the rim at different places which are in different arcs, with the weakening effect of the different arcs in staggered relation so that any thrust caused by road roughness or otherwise will not be a radial thrust, but will be distributed through all parts of the felly. Thus the shocks and strains will be dissipated, a less resilient and less expensive tire can be used if desired, and the effect of shock dissipation preserved.

In carrying out the idea I also arrange that the inner and outer parts of weakening of the felly while in staggered relation also overlap so that a continuous resilience of rim results without noticeably weakening the felly or wheel, and having these parts disposed so that a conventional or preferred felly can without any appreciable cost be made to have the effect described, and to embody the principle of my invention. In practice I have found a convenient and simple way to be to cut circumferentially spaced crescent shaped slits in the sides of the felly at one radius, and other similarly shaped slits or weakenings in staggered relation to the first set and at a longer radius, all of which will be more clearly understood from the description which follows.

Reference is to be had to the accompanying drawings forming a part of this specification, in which similar reference characters indicate corresponding parts in all the views.

Figure 1 is a side elevation showing one embodiment of my invention.

Figure 2 is a broken development or plan of a blank which can be shaped into a felly.

Figure 3 is a broken perspective view of a part of the felly.

Figure 4 is a section on the line 4—4 of Figure 1.

Figure 5 is a section on an enlarged scale on the line 5—5 of Figure 1.

Figure 6 is a side elevation of another form of the felly.

Figure 7 is a cross section on the line 7—7 of Figure 6, and

Figure 8 is a cross section on the line 8—8 of Figure 6.

The felly shown in Figures 1 to 5 is formed of a blank 10 having parallel sides 11, and annular corrugations 12 adapted to support a conventional rim 13. This structure is illustrated because it is substantially a form of felly which is very widely used in wheels of motor cars, and the rim 13 can be of any approved type, and the felly can be used with artillery wheels, disc wheels, or any preferred spoke system. In the sides of the felly and preferably at places just outside the corrugation 12, if a corrugation is used, are cut crescent shaped slots 14 which are circumferentially spaced as the drawing shows, and which have at least one wall turned inward as at 15 to prevent too much weakening. It follows that at these places the sides of the felly will have a certain resilience, and will yield slightly under a sudden shock. At other and outer places are also slots 16 of similar shape, which in the present instance are made in the edge of the felly sides 11, and the inner edges of the slots are turned in as at 17 to prevent excessive weakening.

Referring now to Figure 1 it will be seen that the weakened parts 16 are staggered with respect to the weakened parts 14, and further that the tapering end portions of the slots or weakened parts 14 and 16 overlap, so that in the case of a sudden shock, instead of this shock being imparted radially to the wheel and to the vehicle which it carries, the shock will be absorbed to a certain extent by one of the weakened parts, either 14 or 16, which must come directly opposite the point of shock, and the strain is transmitted to the end parts of the weakened portion, and so distributed through the entire felly, and as the parts 14 and 16 overlap, there will be no point of fatigue or dead point where there is no resilience. On the other hand this method of weakening the felly slightly and at spaced and staggered positions, does not weaken the felly to the extent of making the structure too weak, and the commercial felly can easily be made in this way without changing the shop practice of manufacture. Such fellies are usually shaped from a blank, and in Figure 2 it will be seen that the parts 14 and 16 can be stamped or shaped in the blank when the blank is died out, and that when the felly is shaped to its form shown in the drawings, the weakened portions will be correctly positioned, so that it will appear clearly that this slight change in structure will not alter shop practice of manufacture to any appreciable extent.

As remarked, I have shown the application to the type of felly 10 because of the wide use of this type, but the felly may be of other forms without in the least affecting the invention. Sometimes the felly and rim are combined as in Figures 6 to 8. In such case the application of the invention is substantially as already indicated. Here the crescent shaped slots 21 are produced in the inner parts of the felly, and correspond to the parts 14 already described, while the overlapping or outer slots 23 are produced in the other parts of the felly, and in staggered relation to the slots 21. Likewise the slots 21 preferably have one wall turned in as at 22, and the slots 23 have a similar inturned wall 24, which in the form shown in Figure 7 can be used to assist in supporting the tire if desired. The felly 19 is of the common drop centre type, and merges into side flanges 20. This showing of the combined felly and rim in no wise alters the invention, because in either case the invention is applied to a felly, and if the felly is a part of the rim or independent thereof as in Figure 4, is immaterial so far as the invention is concerned.

I claim:—

1. A wheel felly having circumferentially spaced weakened portions at one radius, and another set of circumferentially spaced weakened portions at another radius, with the weakened portions of the two sets in staggered relation.

2. A wheel felly having a set of circumferentially spaced weakened parts at one radius, a second set of circumferentially spaced weakened parts at another radius, and with the two sets of weakened parts in staggered relation, and with those of one set overlapping those of the other set.

3. A wheel felly having circumferentially spaced slots in its side at one radius, a second set of circumferentially spaced slots at another radius, and with the two sets of slots in staggered relation.

4. A wheel felly having in its sides inner and outer weakened portions with the said inner and outer weakened portions in staggered relation.

5. A wheel felly having circumferentially spaced inner and outer crescent shaped slots with the inner and outer slots in staggered relation.

6. A wheel felly having in its sides inner and outer slits in staggered relation and with the walls of the slits inturned.

In testimony whereof, I have signed my name to this specification this 26th day of January, 1928.

FREDERICK WILLIAM BAKER.